(12) United States Patent
Atkins

(10) Patent No.: US 6,220,228 B1
(45) Date of Patent: **\*Apr. 24, 2001**

(54) ENGINE FUEL SYSTEMS

(75) Inventor: Nigel Hedley Atkins, Chichester (GB)

(73) Assignee: Pall Corporation, East Hills, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/462,743
(22) PCT Filed: Jul. 16, 1998
(86) PCT No.: PCT/GB98/02100
§ 371 Date: Mar. 13, 2000
§ 102(e) Date: Mar. 13, 2000
(87) PCT Pub. No.: WO99/05410
PCT Pub. Date: Feb. 4, 1999

(30) Foreign Application Priority Data

Jul. 23, 1997 (GB) ............................................. 9715580

(51) Int. Cl.[7] ................................................ F02M 37/04
(52) U.S. Cl. ...................... 123/510; 123/516; 123/514
(58) Field of Search .................. 123/510, 514, 123/516, 557

(56) References Cited

U.S. PATENT DOCUMENTS

| | | | |
|---|---|---|---|
| 4,079,717 | * 3/1978 | Shirose | 123/516 |
| 4,117,817 | * 10/1978 | Nishida | 123/516 |
| 4,298,358 | 11/1981 | Ruschke. | |
| 4,314,539 | * 2/1982 | Schade | 123/514 |
| 4,589,395 | * 5/1986 | Timms et al. | 123/516 |
| 4,658,797 | * 4/1987 | Brand | 123/516 |
| 5,115,784 | * 5/1992 | Mito et al. | 123/516 |
| 5,468,388 | 11/1995 | Goddard et al. . | |
| 5,730,106 | * 3/1998 | Gonzalez | 123/516 |
| 5,740,784 | * 4/1998 | McKinney | 123/510 |
| 5,832,902 | * 11/1998 | Davis et al. | 123/514 |
| 5,863,317 | * 1/1999 | Smith et al. | 55/498 |
| 5,894,833 | * 4/1999 | Kikuchi et al. | 123/516 |
| 6,063,152 | * 5/2000 | Teter | 55/385.1 |

FOREIGN PATENT DOCUMENTS

| | | |
|---|---|---|
| 307 739 | 3/1989 | (EP) . |
| 90 11444 | 10/1990 | (EP) . |
| 2 140 706 | 4/1984 | (GB) . |

* cited by examiner

Primary Examiner—Thomas N. Moulis
(74) Attorney, Agent, or Firm—Leydig, Voit & Mayer, Ltd.

(57) ABSTRACT

A fuel system, particularly a diesel fuel system for a car engine (12), includes a fuel filter (11). The filter (11) has an air outlet (18, 22) spanned by an oleophobic filter medium (26). This allows significant volumes of air to be vented while not wetting out when contacted by fuel and so allowing only very small quantites of fuel to pass the filter medium (26).

10 Claims, 3 Drawing Sheets

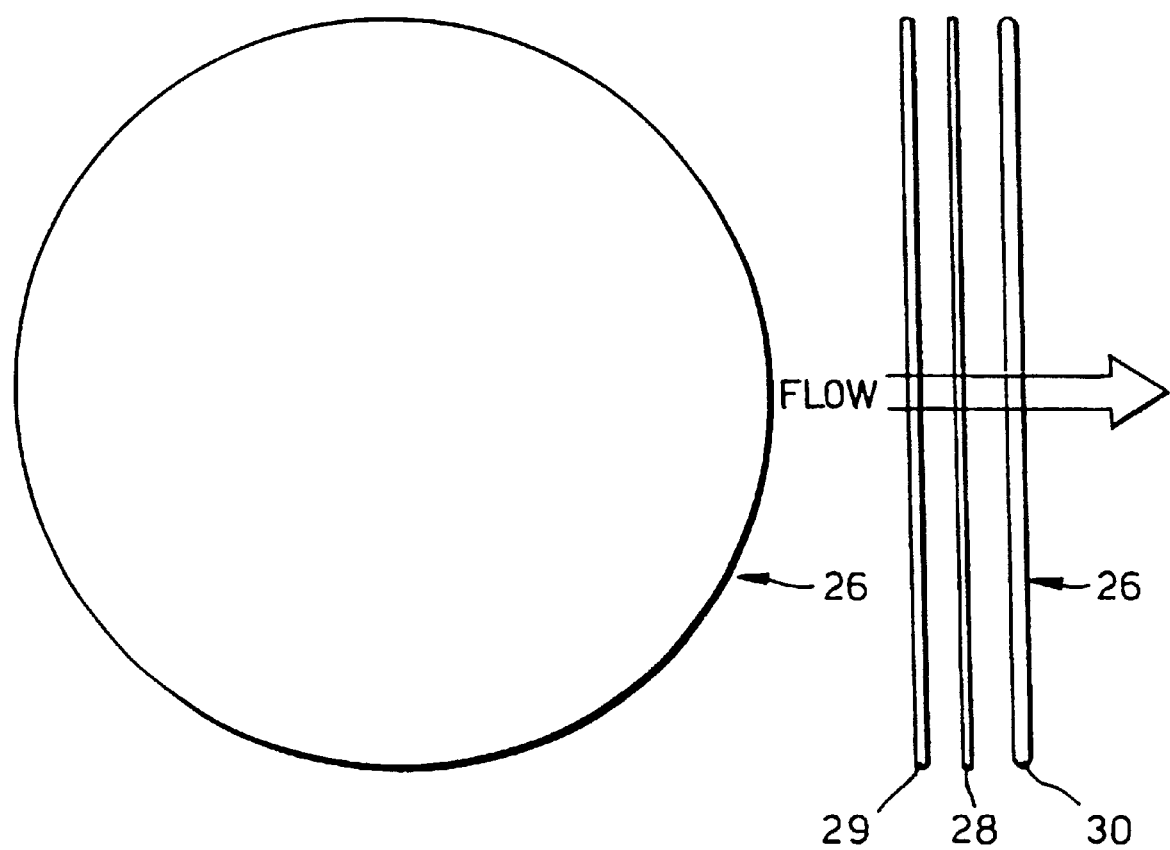

ENGINE FUEL SYSTEMS

Figure 1:
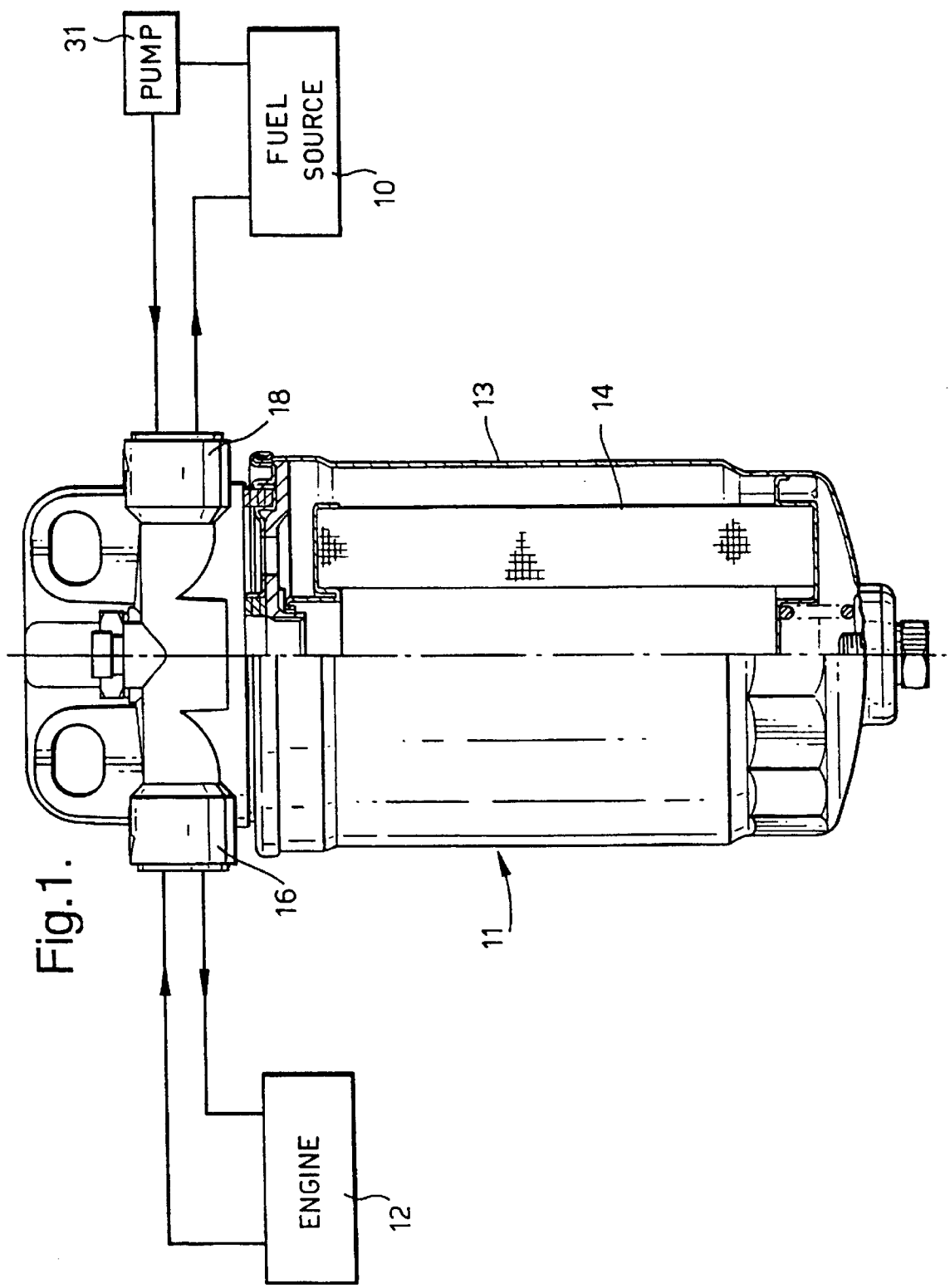

The invention relates to engine fuel systems and to engine assemblies incorporating such systems.

An engine fuel system provides fuel from a source to an engine. Since the fuel may include entrained air, and since such air is undesirable in the fuel fed to the engine, it is customary to provide a device for removing such air before it reaches the engine.

It has previously been proposed to use for this purpose manually operated bleed valves, float control valves or restrictor orifices. A manually operated bleed valve opens an air vent when operated to allow the release of accumulated air. A float valve has a chamber containing the fuel which, as the chamber fills with air, causes the float to open an air vent to release accumulated air until the float once again reaches a position where the air outlet is closed. A restrictor orifice is a small aperture intended to allow the passage of air but halt the passage of fuel. A typical orifice diameter might be 0.25 to 0.35 mm.

All of these proposals have problems. Manual valves are difficult to operate and, if they are not closed as the last air exits, they can cause the spillage of fuel. In addition, they cannot be operated during the time the engine is running if it is installed in a vehicle.

Float valves are expensive and can be orientation-sensitive when the engine forms part of a vehicle. They are also sensitive to vibration and shock.

The problem with restrictor orifices is that they are easily blocked by a single large particle. In addition, when the system is initially filled from dry, the flow rate through the orifice is not sufficiently high. In order to overcome this, some systems using orifices incorporate other systems for removing the initial air in the system. These can involve the application of vacuum or manual venting. If the restrictor orifice is made larger, for example in excess of 0.5 mm in diameter, the blockage and air flow problems are reduced but there is significant flow of fuel through the orifice. While this fuel can be returned to the source, the engine can become starved of fuel as the filter blocks or the returning fuel can transmit so much heat to the source that the engine never becomes warm. In a vehicle, this can cause the passenger compartment heater to become inoperative.

In view of these difficulties, restrictor orifices and float valves are normally avoided. Engines in vehicles are normally provided with manual valves with instructions to users on how to start the vehicle if the vehicle runs out of fuel.

According to a first aspect of the invention, there is provided an engine fuel system comprising a passage for conveying fuel from a source to an engine, the passage including an air vent, an oleophobic filter medium being provided in said vent through which air is vented but which resists the passage of fuel without wetting out.

The term "oleophobic", as used in this specification in relation to a filter medium, defines a filter medium which yields a minimum contact angle of between 100° and 140°, preferably about 100°, with mineral oil when measured by the Sessile Drop Method. This known method involves the measurement of the tangent angle of a stationary drop of oil resting on a flat surface of the filter medium, the angle being measured by a microscope.

The invention also includes within its scope an engine assembly comprising an internal combustion engine and a source of fuel and an engine fuel system according to the first aspect of the invention, connected between the fuel source and the engine.

The use of an oleophobic filter medium allows the venting of large volumes of air but minimal volumes of fuel.

Figure 2:
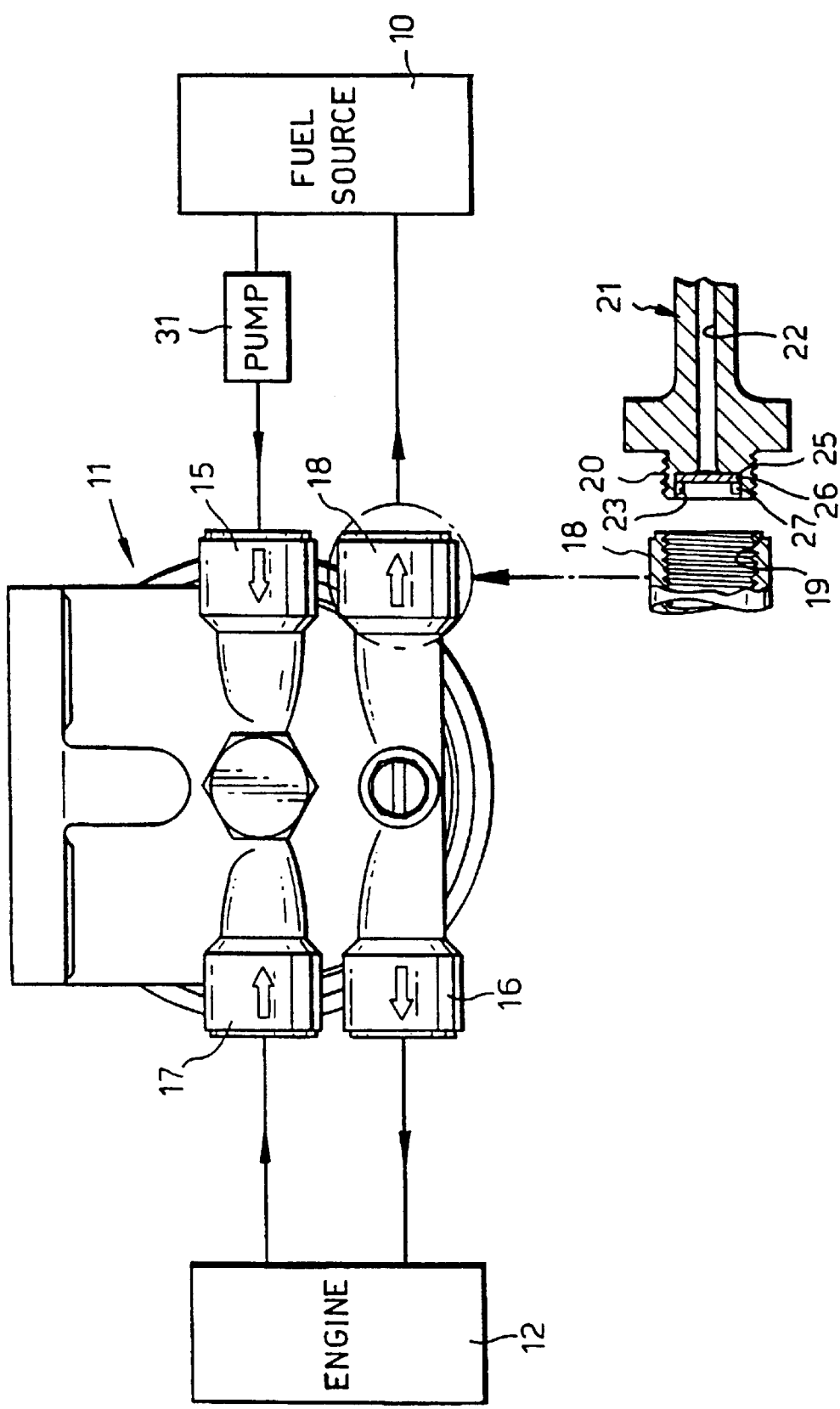

The following is a more detailed description of an embodiment of the invention, by way of example, reference being made to the accompanying drawing in which:

FIG. 1 is a schematic view of an engine assembly including a fuel source and an engine with a fuel filter interposed between the source and the engine, the fuel filter being shown in side elevation, FIG. 2 is a similar view to FIG. 1 but showing the fuel filter in plan view and showing also a detail of an air outlet of the fuel filter, and FIG. 3 is a plan view and an exploded view of a filter element inserted in the air outlet of the fuel filter of the engine assembly of FIGS. 1 and 2.

Referring first to FIGS. 1 and 2, the engine assembly comprises a fuel source 10, a fuel filter 11 and an engine 12.

The fuel filter 11 comprises a housing 13 accommodating a filter element 14. The housing has a fuel inlet 15 connected to the fuel source 10 and a fuel outlet 16 connected to the engine 12 for passing filtered fuel to the engine. 12. In addition, the housing 13 has a fuel return inlet 17 for receiving excess fuel from the engine 12 and an air control port 18. The air control port 18 is connected by a line to the fuel source 10.

The engine 12 may be a diesel automobile engine and the fuel source 10 may contain diesel fuel.

The remaining parts of the fuel filter are conventional and will not be described in detail. It will be appreciated that any suitable fuel filter can be used.

As seen in the detail of FIG. 2, the air control port 18 has a threaded interior 19. This receives a threaded projection 20 on a connector plug 21. The connector plug 21 is provided with a through passage 22 which has a larger diameter portion 23 within the threaded projection connected to a smaller diameter portion 24 by way of a step 25.

A generally circular filter assembly 26 extends across the larger diameter portion 23 and is held against the step 25 by a locating collar 27. The filter assembly 26 is shown in more detail in FIG. 3.

Referring to FIG. 3, the filter assembly 26 is formed from three discs of material. The central disc is an oleophobic filter medium 28. The term "oleophobic" is as defined above and in general terms means that the membrane is not wettable by oil-based products such as petrol and diesel fuel. This filter medium 28 is sandwiched between an upstream support layer 29 and a downstream support and drainage layer 30. The three layers are welded together around their circumference.

In use, fuel from the fuel source 10 is pumped to the fuel filter 11 by a pump 31. Air already in the system is pushed through the system by the advancing fuel and exits through the air control port 18. The permeability of the filter medium 28 is such that, for example, it can accommodate an air flow of greater than 200 liters/hour at a differential pressure of 700 mbar with an area of 100 $mm^2$ and diesel fuel. As a result of this, all the initial air in the system can be evacuated through the port 18 without the need for any special measures. The air is vented back into the fuel source 10.

When a flow of fuel has been established from the fuel source 10 to the engine 12, the air entrained in the fuel as a result, for example, of foaming, passes through the port 18. This air may contain fuel, either in the form of liquid or vapours, but since the filter medium 28 is oleophobic, the filter medium 28 will not wet out with fuel and thus only very little fuel will pass the filter medium 28. This may be less than 20 mls/hour for an area of filter medium 28 of 100 $mm^2$. This fuel is returned to the fuel source 12.

If the fuel source 10 runs out of fuel, the port 18 continues to vent air and, under these circumstances, pass volume significantly in excess of 200 liters/hour with 100 mm² of filter medium area, diesel fuel and 700 mbar differential pressure.

The small amount of fuel transferred back to the fuel source 10 means that there is no problem of transferring significant quantities of heat from the engine 12 to the fuel source 10. A comparatively large area of the assembly 26 means that it is not susceptible to blockage by single particles. No manual intervention is required.

It will be appreciated that the oleophobic filter medium 28 may be provided in filter assemblies 26 other than those having upstream and downstream support layers. Further, the assembly need not be provided at a fuel filter 11, it could be provided at any point in a fuel system. Although the assembly finds particular application in motor vehicles using diesel fuel, it may be used with any form of internal combustion engine whether stationary or mobile and using any form of oil-based fuel.

What is claimed is:

1. An engine fuel system comprising a passage for conveying fuel from a source (10) to an engine (12), the system including an air vent (18, 22), an oleophobic filter medium (26) being provided in said vent (18, 22) through which filter medium (26) air is vented but which resists the passage of fuel without wetting out.

2. A system according to claim 1 wherein the oleophobic filter medium (26) has upstream and downstream support layers (29, 30).

3. A system according to claim 2 wherein one of said upstream and downstream layers (30) includes a drainage layer.

4. A system according to claim 3 wherein the downstream layer (30) includes said drainage layer.

5. A system according to claim 1 and including a filter assembly (11), said assembly comprising a housing (13) having an inlet (15) for connection to said source (10) and an outlet (16) for connection to said engine (12), the air vent (18, 22) leading from said housing (13).

6. A system according to claim 1 wherein said outlet (16) is connectable to the source (10).

7. A system according to claim 1 wherein the air vent (18, 22) is connectable to the source (10).

8. A system according to claim 1 wherein, at a filter medium area of 100 mm², a differential pressure across the filter medium of 700 mbar, the air flow is greater than 200 liters/hour and the flow of fuel is less than 20 mls/hour.

9. An engine assembly comprising an internal combustion engine (12), a source (10) of fuel and an engine fuel system according to claim 1 connected between the fuel source (10) and the engine (12).

10. An assembly according to claim 9 wherein the engine (12) is a diesel engine.

\* \* \* \* \*